United States Patent

[11] 3,590,617

| [72] | Inventor | Ralph W. Mount<br>R.R. #1, Zelienople, Pa. 16063 |
|---|---|---|
| [21] | Appl. No. | 728,425 |
| [22] | Filed | May 13, 1968 |
| [45] | Patented | July 6, 1971 |

[54] PIPE BENDING TOOL WITH IMPROVED ANGULAR INDICATOR
1 Claim, 4 Drawing Figs.

[52] U.S. Cl................................................. 72/34, 33/206
[51] Int. Cl..................................................... B21c 51/00
[50] Field of Search................................. 72/34, 31, 32, 33, 35; 73/323; 33/206, 220, 207

[56] References Cited
UNITED STATES PATENTS

| 2,411,165 | 11/1946 | McBride | 33/206 |
| 2,785,477 | 3/1957 | Gregory | 33/207 |
| 2,384,453 | 9/1945 | Chaney et al. | 33/206 |
| 3,396,565 | 8/1968 | Miller | 72/32 |
| 3,106,024 | 10/1963 | Lea | 33/207 |
| 2,932,225 | 4/1960 | Gardner | 72/31 |
| 2,483,029 | 9/1949 | Will | 33/206 |

*Primary Examiner*—Richard J. Herbst
*Assistant Examiner*—Michael J. Keenan
*Attorney*—Jeffers and Young

ABSTRACT: A pipe-bending tool is provided with an elongated, arcuate transparent tube and is provided with angular marks. A ball is positioned in the tube which is closed at its ends. As the tool is operated to bend a pipe, the position of the ball relative to the angular marks indicates the angle of the bend.

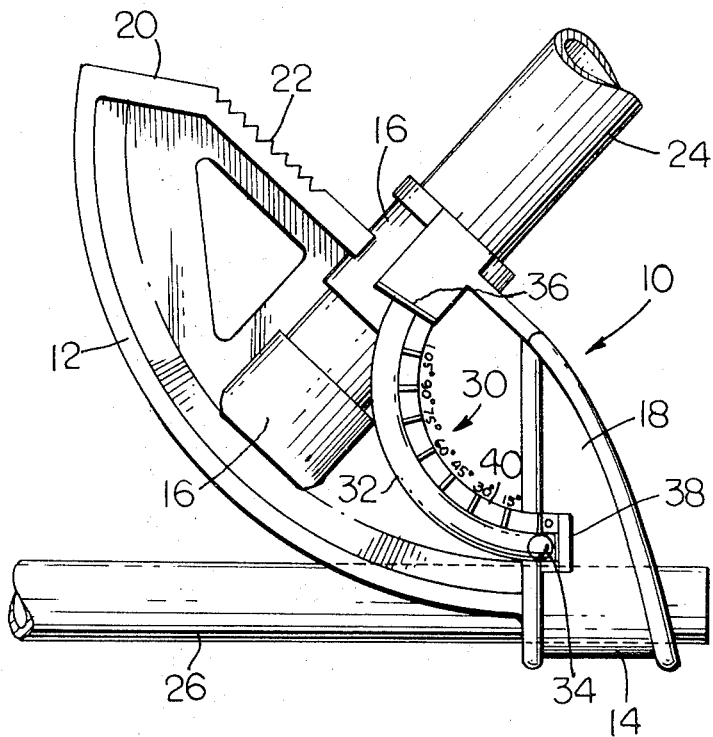

PIPE BENDING TOOL WITH IMPROVED ANGULAR INDICATOR

BACKGROUND OF THE INVENTION

My invention relates to a pipe bending tool with an angular indicator, and particularly to such a tool with an improved angular indicator that is accurate and reliable.

Bending tools are used to bend pipe, conduit, or other tubular materials through some angle in order that the pipe, conduit, or other tubular material have the desired configuration. Various devices have been provided for indicating the angle of the bend, but these devices are unsatisfactory for various reasons. For example, an indicator is described and shown in U.S. Pat. No. 3,253,441 granted May 31, 1966. When this indicator is in good working condition, it performs satisfactorily. However, the pointer and its pivot may become dirty so that the pointer does not swing freely, a condition that will cause inaccurate indications. Or, the pivot may become bent or deformed in use so that the pointer does not swing freely and accurately. These conditions may be, and usually are, unknown to the user so that inaccurate bends are made, resulting in wasted time and material.

Accordingly, an object of my invention is to provide a pipe bending tool with an improved angular indicator.

Another object of my invention is to provide a pipe bending tool with an angular indicator that is relatively accurate.

Another object of my invention is to provide an improved angular indicator for a pipe bending tool, the indicator having an accuracy which is consistently and reliably good, and which, if it becomes poor, is self-evident.

Another object of my invention is to provide an angular indicator that is protected from normal abuse during the use of the bending tool.

SUMMARY OF THE INVENTION

Briefly, these and other objects are achieved in accordance with my invention by an improved indicator that can be used on many types of pipe bending tools. The indicator comprises a transparent, arcuate tube containing a ball that can roll in the tube. The tube is closed at its ends and is provided with angular markings. As the bending tool is operated or rotated, the ball rolls in the tube and rests at the lowest point in the tube. The position at which the ball comes to rest relatively to the angular markings indicates the angle of bend provided by the bending tool. This angle can be duplicated on reverse bends to make accurate offsets of any desired degree. This angular indication is accurate, because no dirt or foreign matter can impede movement of the ball, because the ball rolls easily in the tube, and because if the tube becomes cracked or damaged to impede movement of the ball, this damage is self-evident.

BRIEF DESCRIPTION OF THE DRAWING

The structure and operation of my invention, together with further objects and advantages, may be better understood from the following description given in connection with the accompanying drawing in which:

FIG. 1 shows a pipe bending tool having my improved angular indicator and with the tool and indicator positioned at the beginning of a bend;

FIG. 2 shows the pipe bending tool having my improved angular indicator and with the tool and indicator positioned during or at the end of a bend;

DESCRIPTION OF THE PREFERRED EMBODIMENT

Figure 3:
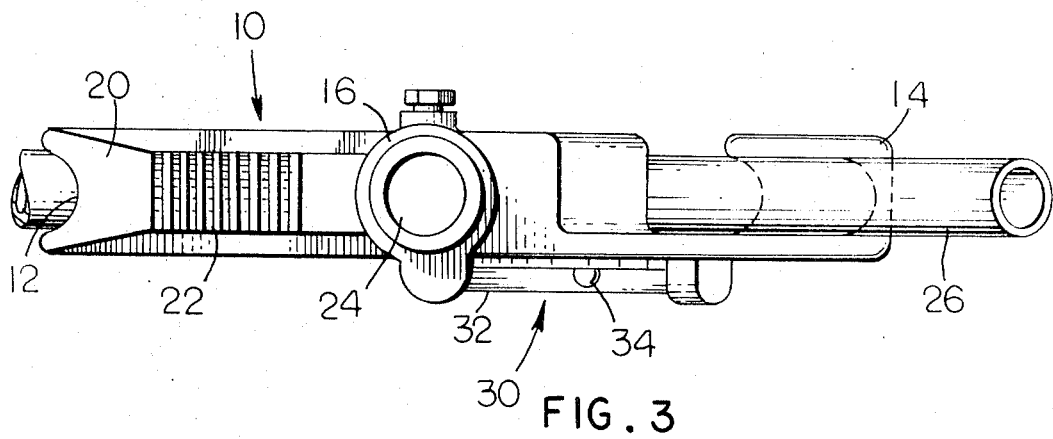
FIG. 3 shows a top view of the pipe bending tool of FIGS. 1 and 2.

In FIG. 1, I have shown a pipe bending tool 10 which is provided with the improved indicating device in accordance with my invention. As used herein, pipe is intended to include conduit and tubular material. The tool 10 is known in the art and comprises a pipe bending portion 12 formed in a circular arc having a concave cross section. (The pipe bending portion 12 may be formed in other curves, depending upon the shape of bend desired). One end of the pipe bending portion 12 terminates in a pipe gripping portion 14 which has a sleeve or finger that receives and retains the pipe during the bending operation. The portions 12, 14 are joined to a handle socket 16 or shank by members 18, 20. The member 20 is provided with a tread or foot rest 22 to enable a person to apply additional force or foot pressure during the bending of a pipe. The handle socket 16 generally has a circular cross section to receive a handle 24. The handle 24 is not shown in its full length in FIG. 1, but it is to be understood that the handle 24 may be any desired length in order to provide the necessary force on the bending tool 10. The bending tool 10 as thus far described is known in the art. When used, a length of pipe 26 is placed in the pipe retaining portion 14 and, as viewed in FIG. 1, the handle 24 is moved to the left. This causes the pipe retaining portion 14 to pull or bend the pipe 26 up and around the pipe bending portion 12 to form a smooth or, in the embodiment shown, circular arc. FIG. 2 shows the tool in the position after the pipe has been bent approximately 45 degrees.

In order that bends of desired angles can be made accurately and reliably, I provide an improved indicator 30 on the bending tool 10 disposed within a pocket defined by portion 14, web member 18 and shank 16. The indicator 30 comprises an elongated transparent tube 32 containing a ball 34. The transparent tube 32 may be made of glass or plastic and is closed at its ends. The tube 32 is held on the tool 10 by retaining members 36, 38. In a preferred embodiment, I construct the tube 32 by bending a glass tube of circular cross section and desired diameter along a suitable circular arc which is calibrated relatively to the pipe bending portion 12 so that the ball position relating to the markings on indicator plate 40 will give a direct read out as to the degree of bending effected by the bending tool. I then place the ball 34 in the tube 32 and seal the tube ends. Or, the members 36, 38 can be used to seal the tube ends. The indicator 30 is provided with an indicator plate 40 which is mounted adjacent the tube 32 and which is provided with suitable markings in degrees. As shown in FIGS. 1 and 2, these markings are made every 15 degrees but it is to be understood that other angles may be marked and indicated. The indicator plate 40 may be made separately and mounted alongside the inner curve of the tube 32 as shown in FIGS. 1 and 2, or it may be mounted behind the tube 32 (as viewed in FIGS. 1 and 2) in order that the ball 34 appears in front of the plate markings. Or, the plate 40 may be cast with the tool in manufacture. The indicator 30 may be positioned in any location on the bending tool 10 as long as its concave arc or surface is generally upward as shown. It is preferred that the plane of the arc of the tube 32 be parallel to the plane in which the pipe 26 is bent in order that the ball 34 be most sensitive to motion. This construction is shown in FIG. 3. And for ease of reading most bends, it is preferred that the ball 34 be adjacent the 0° marking when the pipe 26 is horizontal.

With the indicator 30 positioned on the bending tool 10 and with the bending tool 10 positioned on a pipe 26 as shown in FIG. 1, the ball 34 indicates or is adjacent to the 0° marking. As the tool 10 is rotated by moving the handle 24 to the left as viewed in FIG. 1, the pipe 26 is bent. In FIG. 2, the handle has been rotated through an angle of 45° to bend the pipe 45° and it will be seen that the ball 34 is adjacent or beneath the calibrated 45 degree marking on the indicator 30. Thus, accurate and reliable angles of pipe bend may be indicated by my indicator 30.

Figure 4:
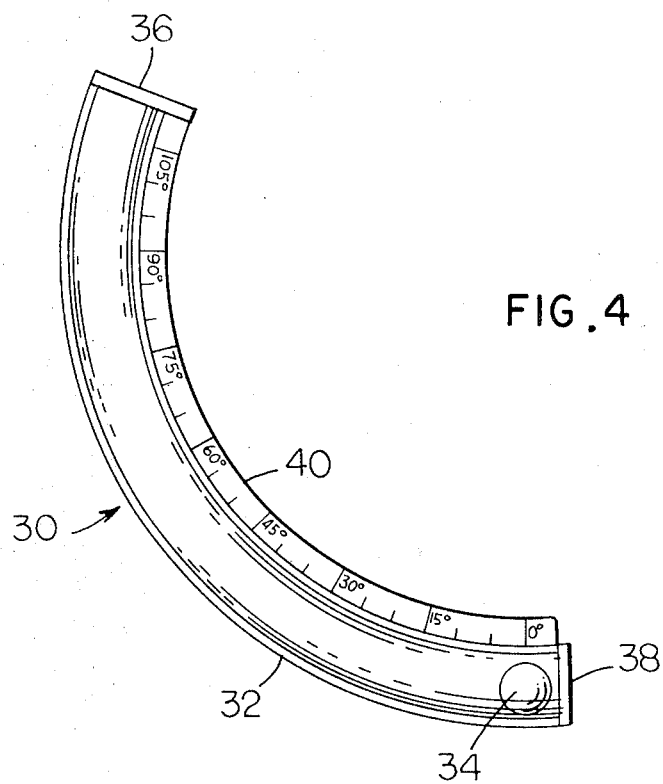
FIG. 4 shows a more detailed view of my improved angular indicator.

FIG. 4 shows an enlarged view of the indicator 30 removed from the bending tool 10. FIG. 4 shows the marking plate 40 marked in 15° increments from 0° to 105°. It is to be understood that the marking plate 40 may be provided with more markings, and that the tube 32 may extend through a greater or lesser arc than shown in FIG. 4. FIG. 4 also shows that the ball 34 has a diameter almost as great as the internal diameter of the tube 32. It is preferable that the ball 34 fit within the tube 34 with very little clearance, in order that the ball 32 not bounce between the walls of the tube 32 and possibly break it.

It will be understood that the ball 34 rolls relatively easily within the tube 32, since the ball 34 may be made of a hard stainless steel or glass and the tube 32 may be made of glass (which is hard) to provide surfaces having very little friction between them. Thus, movement of the ball is very sensitive to movement of the bending tool, and hence provides an accurate indication.

It will thus be seen that my invention provides an improved indicator for indicating with a relatively high degree of accuracy the angle through which a pipe bending tool is moved. The indicator is substantially free from inaccuracies which would otherwise result from dirt and foreign matter getting on the moving parts, since the moving ball of my indicator is sealed against dirt. It is preferable, but not necessary that my tube 32 be sealed at its ends with glass in order to provide an airtight construction. If desired, the interior portions of the ends may be cushioned with a resilient material which prevents the ball 34 from rolling against the ends and possibly breaking them. As long as the glass or transparent tube 32 is intact, an accurate reading is provided by my indicator. If the glass tube is intact, there is no possibility of dirt or foreign matter reaching the ball 34 and impeding its free, rolling movement. If the glass tube is damaged or broken (i.e., not intact), this condition is readily apparent, and a user knows the indicator may be inaccurate. Persons skilled in the art will appreciate that modifications may be made. For example, in place of the ball 34, my glass tube may be filled with a suitable liquid having an air bubble. In this case, the tube would be inverted with its convex arc or surface upward so that the air bubble always seeks the highest point as distinguished from the ball which always seeks the lowest point. Thus, the air bubble can indicate the degree of angular movement. Persons skilled in the art will also appreciate that various angular markings and arcs may be provided. Therefore, while my invention has been described with reference to a particular embodiment, it is to be understood that modifications may be made without departing from the spirit of the invention or from the scope of the claims.

I claim:

1. A combination pipe bending tool and indicator for providing a visual measurement of the degree of bending effected by said tool comprising: an arcuate forming surface against which the pipe is bent to form a curvature, means forming a gripping surface angularly spaced from said arcuate forming surface, a shank, a web member extending between said gripping surface and said shank, located relatively to said gripping surface and said arcuate forming surface to define a pocket therebetween wherein said indicator is disposed protectively thereby, said gripping surface being arranged to communicate bending force to said pipe, a handle combined with said shank for manually developing bending force on said pipe through forcible turning of said tool, transparent indicator means disposed within said protective pocket and having a curved surface which is calibrated by a plurality of markings therein to provide the same degree of angular movement as the angular movement effected by said tool during bending, said plurality of calibrated markings providing numerical read outs of angular movement of said bending tool and bending produced thereby, a movable ball confined to the angular movement defined by said indicator means and positioned relatively to said indicator means and calibrated markings to indicate by its position the degree of bending effected by said tool, and mounting means for positioning said indicator means within said pocket for movement with said tool.